United States Patent
Kawai

(10) Patent No.: US 10,050,782 B2
(45) Date of Patent: Aug. 14, 2018

(54) DECRYPTION CONDITION ADDITION DEVICE, CRYPTOGRAPHIC SYSTEM, AND COMPUTER READABLE MEDIUM

(71) Applicant: MITSUBISHI ELECTRIC CORPORATION, Tokyo (JP)

(72) Inventor: Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/517,102

(22) PCT Filed: Dec. 5, 2014

(86) PCT No.: PCT/JP2014/082255
§ 371 (c)(1),
(2) Date: Apr. 5, 2017

(87) PCT Pub. No.: WO2016/088250
PCT Pub. Date: Jun. 9, 2016

(65) Prior Publication Data
US 2017/0310474 A1    Oct. 26, 2017

(51) Int. Cl.
*H04L 29/06* (2006.01)
*H04L 9/08* (2006.01)
(Continued)

(52) U.S. Cl.
CPC ............ *H04L 9/085* (2013.01); *H04L 9/0618* (2013.01); *H04L 9/0822* (2013.01);
(Continued)

(58) Field of Classification Search
CPC .. H04L 2209/12; H04L 9/0618; H04L 9/0861
See application file for complete search history.

(56) References Cited

U.S. PATENT DOCUMENTS 8,533,493 B1 *    9/2013    Tzeng ..................... H04L 9/00
                                                                    380/44
2012/0321074 A1 * 12/2012   Seurin .................... H04L 9/06
                                                                    380/28
(Continued)

FOREIGN PATENT DOCUMENTS

JP    2012-133214 A    7/2012
JP    2013-78042 A     4/2013
(Continued)

OTHER PUBLICATIONS

Arita, "Flexible Attribute-Based Encryption", Jul. 9, 2012, Graduate School of Information Security, Institute of Information Security, Japan, pp. 1-12.
(Continued)

*Primary Examiner* — Jason K Gee
(74) *Attorney, Agent, or Firm* — Birch, Stewart, Kolasch & Birch, LLP

(57) ABSTRACT

A decryption condition addition device (300) acquires an original ciphertext $ct_s$ in which a secret distribution matrix M is set as information specifying a decryption condition and acquires an additional access structure $S^+$ which is a restriction condition to restrict the decryption condition of the original ciphertext $ct_s$. The decryption condition addition device (300) adds a row and a column which are indicated in the additional access structure $S^+$ to the secret distribution matrix M set in the original ciphertext $ct_s$, and thereby generates an updated ciphertext $ct_s$, for which the decryption condition of the original ciphertext $ct_s$ is restricted.

6 Claims, 17 Drawing Sheets

(51) Int. Cl.
*H04L 9/06* (2006.01)
*H04L 9/14* (2006.01)
*H04L 9/30* (2006.01)

(52) U.S. Cl.
CPC .............. *H04L 9/0861* (2013.01); *H04L 9/14* (2013.01); *H04L 9/30* (2013.01)

(56) References Cited

U.S. PATENT DOCUMENTS

| 2013/0028415 A1* | 1/2013 | Takashima ............ H04L 9/0847 380/44 |
| 2013/0173929 A1 | 7/2013 | Takashima et al. |
| 2014/0208117 A1 | 7/2014 | Hayashi et al. |
| 2015/0010147 A1 | 1/2015 | Takashima et al. |

FOREIGN PATENT DOCUMENTS

| JP | 2013-207387 A | 10/2013 |
| WO | WO 2011/135895 A1 | 11/2011 |
| WO | WO 2013/133158 A1 | 9/2013 |

OTHER PUBLICATIONS

Doi, "Secret Distribution Methods and Its Applications", Joho Security Sogo Kagaku, Nov. 1, 2012, vol. 4, pp. 137-149, retrieval date Feb. 4, 2015, Internet <URL:http://www.iisec.ac.jp/proc/vol0004/doi.pdf>.
Kawai et al., "Fully-Anonymous Functional Proxy-Re-Encryption", May 29, 2013, pp. 1-71.
Kawai, "Outsourcing the Re-Encryption Key Generation of AB-PRE", Computer Security Symposium 2014, Oct. 22-24, 2014, pp. 797-804.
Kuno et al., "Ciphertext-Policy Attribute-Based Encryption with Attribute Update", 2011 Nen Symposium on Cryptography and Information Security SCIS2011 [CD-ROM], Jan. 25, 2011, 2A4-3, pp. 1-8.
Lai et al., "Adaptable Ciphertext-Policy Attribute-Based Encryption", © Springer International Publishing Switzerland 2014, LNCS 8365, pp. 199-214.
Okamoto, "Fully Secure Functional Encryption with General Relations from the Decisional Linear Assumption", Nov. 5, 2010, pp. 1-50.
Chinese Office action issued in corresponding Chinese Application No. 201480083496.1 dated Nov. 16, 2017.

* cited by examiner

Fig. 3

$$s_0 = \begin{pmatrix} \overbrace{1,\ldots,1}^{r \text{ COLUMNS}} \end{pmatrix} \begin{pmatrix} f_1, \ldots, f_r \end{pmatrix} = \sum_{k=1}^{r} f_k$$

Fig. 4

$$\vec{s}^T = \underbrace{\begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix}}_{\left(f_1, \ldots, f_r\right)} = \left(s_1, \ldots, s_L\right)$$

US 10,050,782 B2

DECRYPTION CONDITION ADDITION DEVICE, CRYPTOGRAPHIC SYSTEM, AND COMPUTER READABLE MEDIUM

TECHNICAL FIELD

The present invention relates to a technique for restricting a decryption condition set in a ciphertext without decrypting the ciphertext.

BACKGROUND ART

Functional encryption and attribute-based encryption are public key encryption schemes according to which a set of users authorized to decrypt a ciphertext can be set in the ciphertext with a logical expression composed of OR, AND, and NOT. That is, functional encryption and attribute-based encryption are public key encryption schemes according to which a decryption condition of a ciphertext can be set in the ciphertext with a logical expression composed of OR, AND, and NOT. Patent Literature 1 describes a functional encryption scheme.

There is a technique called proxy re-encryption according to which a decryption condition set in a ciphertext can be changed using a re-encryption key without decrypting the ciphertext. Non-Patent Literature 1 describes a proxy re-encryption scheme in functional encryption. Non-Patent Literature 2 describes a proxy re-encryption scheme in attribute-based encryption.

CITATION LIST

Patent Literature

Patent Literature 1: WO 2011/135895 A

Non-Patent Literature

Non-Patent Literature 1: Yutaka Kawai and Katuyuki Takashima, Fully-Anonymous Functional Proxy-Re-Encryption. Cryptology ePrint Archive: Report 2013/318

Non-Patent Literature 2: Junzuo Lai and Robert H. Deng and Yanjiang Yang and Jian Weng. "Adaptable Ciphertext-Policy Attribute-Based Encryption"

SUMMARY OF INVENTION

Technical Problem

In the proxy re-encryption schemes described in Non-Patent Literature 1 and Non-Patent Literature 2, a re-encryption key is always required to change the decryption condition of the ciphertext.

In order to generate a re-encryption key, a user secret key or a master secret key, which is a key that needs to be held in secrecy, is required. In the proxy re-encryption schemes described in Non-Patent Literature 1 and Non-Patent Literature 2, the user secret key or the master secret key is accessed each time a re-encryption key is generated, resulting in an increase in the number of accesses to the user secret key or the master secret key.

It is an object of the present invention to allow a decryption condition of an original ciphertext to be restricted without using a re-encryption key.

Solution to Problem

A decryption condition addition device according to the present invention includes:

an original ciphertext acquisition part to acquire an original ciphertext in which a secret distribution matrix is set as information specifying a decryption condition;

a condition acquisition part to acquire a restriction condition to restrict the decryption condition of the original ciphertext acquired by the original ciphertext acquisition part; and an updated ciphertext generation part to generate an updated ciphertext for which the decryption condition of the original ciphertext is restricted by adding a row and a column which are related to the restriction condition acquired by the condition acquisition part to the secret distribution matrix set in the original ciphertext.

Advantageous Effects of Invention

In the present invention, a decryption condition of an original ciphertext is restricted by adding a row and a column to a secret distribution matrix set in the ciphertext. No re-encryption key is required in order to add the row and the column to the secret distribution matrix. Therefore, it is not necessary to use a re-encryption key to restrict the decryption condition of the original ciphertext.

BRIEF DESCRIPTION OF DRAWINGS

FIG. 3 is an explanatory drawing of a secret value $s_0$ of secret distribution;

FIG. 4 is an explanatory drawing of distributed values $s_1, \ldots, s_L$ of secret distribution;

DESCRIPTION OF EMBODIMENTS

First Embodiment

In a first embodiment, an example of applying a technique for restricting a decryption condition of a ciphertext to ciphertext-policy functional encryption will be described. Restricting the decryption condition of the ciphertext means reducing the number of keys that can decrypt the ciphertext.

*Description of Notations*

Notations to be used in the following description will be described.

When A is a random value or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that z is set to y, y is defined by z, or y is substituted by z.

$$y := z \quad \text{[Formula 103]}$$

When $\underline{a}$ is a fixed value, Formula 104 denotes that a machine (algorithm) A outputs $\underline{a}$ on input x.

$$A(x) \to a \quad \text{[Formula 104]}$$

For example, $$A(x) \to 1$$

Formula 105 denotes a field of order q.

$$\mathbb{F}_q \quad \text{[Formula 105]}$$

Formula 106 denotes a vector representation in a finite field $F_q$.

$$\vec{x} \text{ denotes } (x_1, \ldots, x_n) \in \mathbb{F}_q^n. \quad \text{[Formula 106]}$$

Formula 107 denotes the inner-product, indicated in Formula 109, of two vectors x and v indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n), \quad \text{[Formula 108]}$$

$$\Sigma_{i=1}^n x_i v_i \quad \text{[Formula 109]}$$

Note that $X^T$ denotes the transpose of a matrix X.

For a basis B and a basis B* indicated in Formula 110, Formula 111 is established.

$$\mathbb{B} := (b_1, \ldots, b_N),$$

$$\mathbb{B}^* := (b^*_1, \ldots, b^*_N) \quad \text{[Formula 110]}$$

$$(x_1, \ldots, x_N)_{\mathbb{B}} := \Sigma_{i=1}^N x_i b_i,$$

$$(y_1, \ldots, y_N)_{\mathbb{B}^*} := \Sigma_{i=1}^N y_i b^*_i \quad \text{[Formula 111]}$$

Note that $e_j$ denotes a normal basis vector indicated in Formula 112.

$$\vec{e}_j := (\overbrace{0 \ldots 0}^{j-1}, 1, \overbrace{0 \ldots 0}^{n-j}) \in \mathbb{F}_q^n \text{ for } j = 1, \ldots, n \quad \text{[Formula 112]}$$

*Description of Overview*

The basics of ciphertext-policy functional encryption will be described, and then an overview of the technique for restricting the decryption condition of the ciphertext will be described.

The basics of ciphertext-policy functional encryption will be described.

Figure 1:
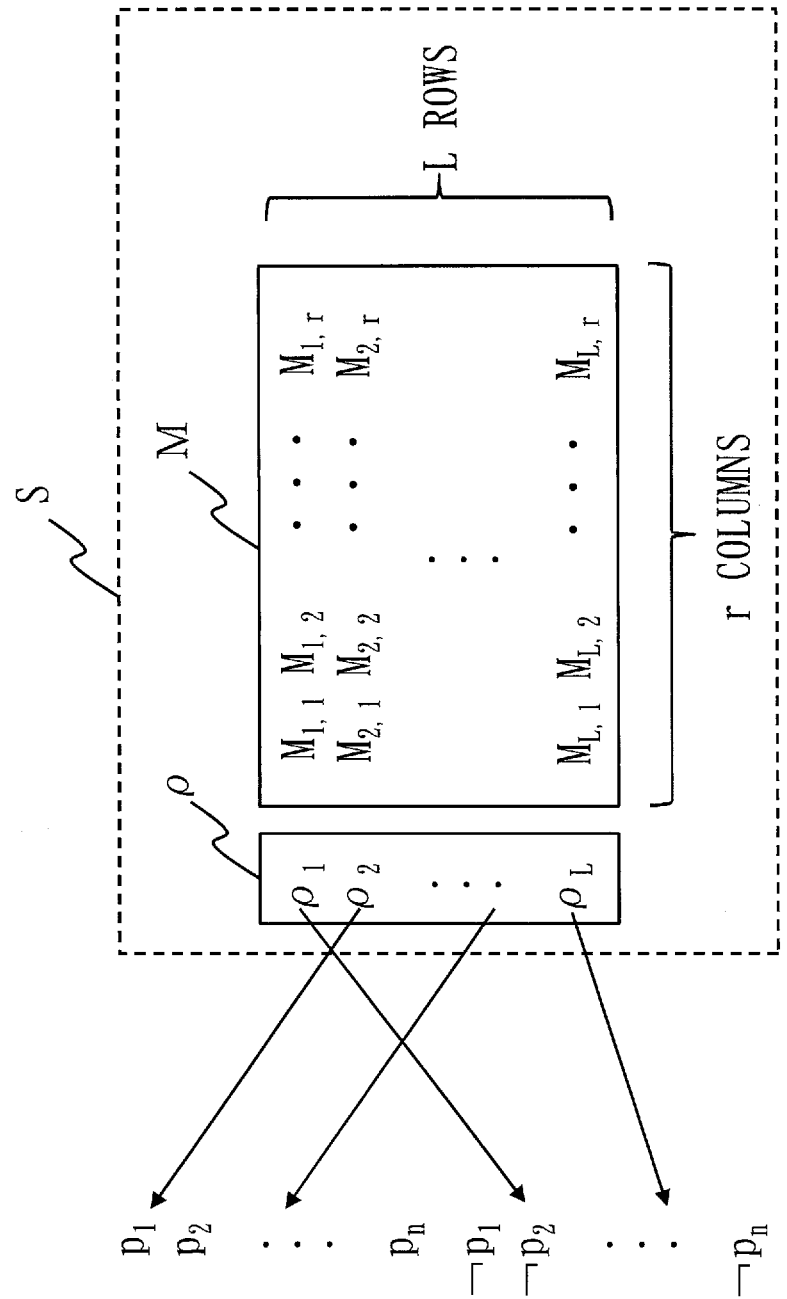
FIG. 1 is an explanatory drawing of an access structure S used in functional encryption.

FIG. 1 is an explanatory drawing of an access structure S used in functional encryption.

In functional encryption, a combination of an L-row and r-column secret distribution matrix M and a label p given to each row of the secret distribution matrix M is used as an access structure S. The label ρ given to each row is related to one literal of positive literals $\{p_1, \ldots, p_n\}$ and negative literals $\{\neg p_1, \ldots, \neg p_n\}$ which are given by a set of variables $\{p_1, \ldots, p_n\}$.

For an input sequence $\delta = \delta_i \in \{0, 1\}$ (i=1, . . . , n), a submatrix $M_\delta$ of the secret distribution matrix M is defined. The submatrix $M_\delta$ consists of those rows of the secret distribution matrix M the labels ρ of which are related to a value "1" by the input sequence δ. That is, the submatrix $M_\delta$ consists of the rows of the secret distribution matrix M which are related to $p_i$ such that $\delta_i=1$ and the rows of the secret distribution matrix M which are related to $\neg p_i$ such that $\delta_i=0$.

Figure 2:
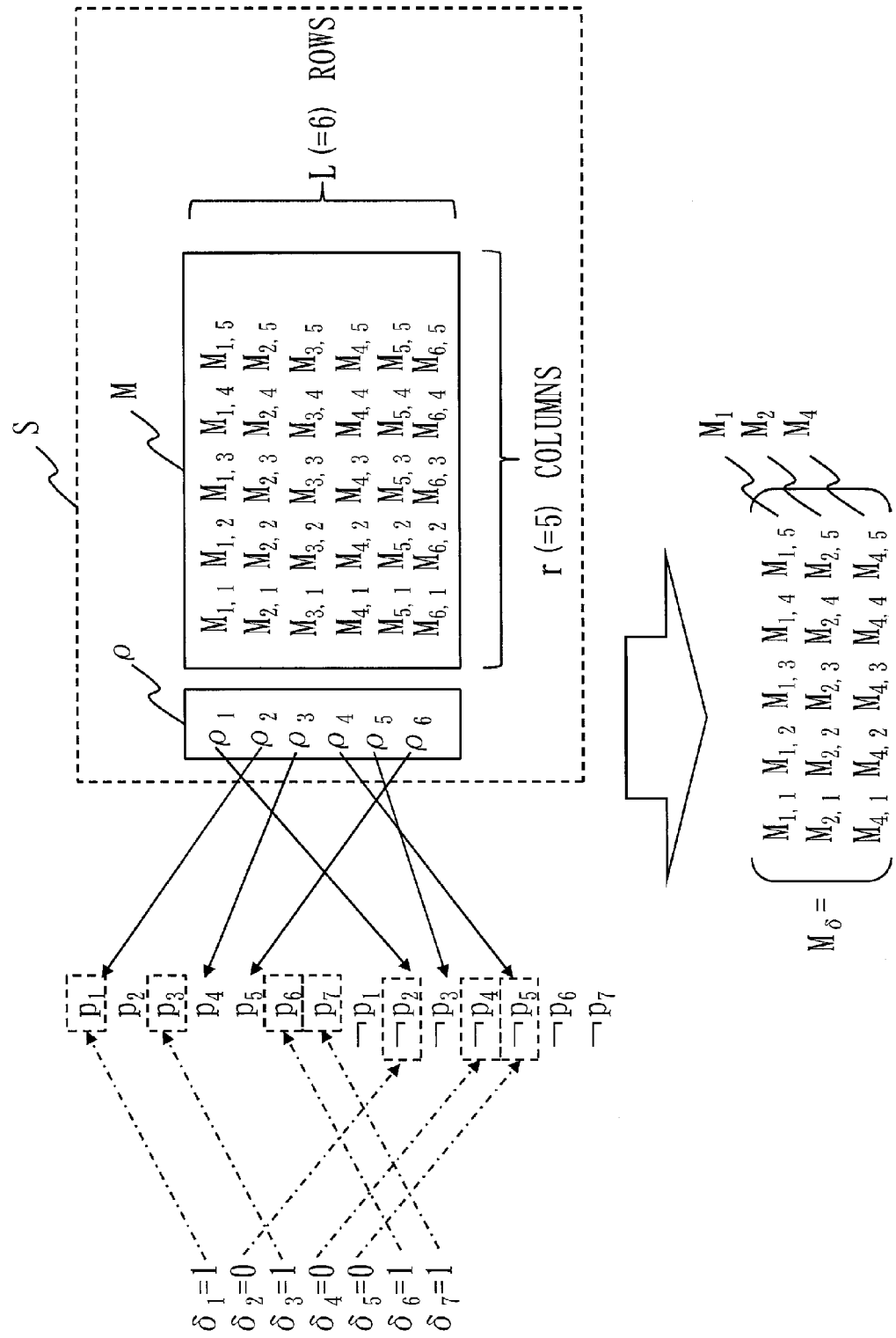
FIG. 2 is an explanatory drawing of a submatrix $M_\delta$.

FIG. 2 is an explanatory drawing of the submatrix $M_\delta$.

In FIG. 2, note that n=7, L=6, and r=5. That is, the set of variables is $\{p_1, \ldots, p_7\}$, and the matrix M has six rows and five columns. In FIG. 2, assume that the labels ρ are related such that $\rho_1$ is related to $\neg p_2$, $\rho_2$ to $p_1$, $\rho_3$ to $p_4$, $\rho_4$ to $\neg p_5$, $\rho_5$ to $\neg p_3$, and $\rho_6$ to $p_5$.

Assume that in the input sequence δ, $\delta_1=1$, $\delta_2=0$, $\delta_3=1$, $\delta_4=0$, $\delta_5=0$, $\delta_6=1$, and $\delta_7=1$. In this case, the submatrix $M_\delta$ consists of the rows of the secret distribution matrix M which are related to literals $(p_1, p_3, p_6, p_7, \neg p_2, \neg p_4, \neg p_5)$ surrounded by broken lines. That is, the submatrix $M_\delta$ consists of the first row ($M_1$), second row ($M_2$), and fourth row ($M_4$) of the secret distribution matrix M.

When $[\rho(j)=p_i] \wedge [\delta_i=1]$ or $[\rho(j)=\neg p_i] \wedge [\delta_i=0]$, then map $\gamma(j)=1$; otherwise map $\gamma(j)=0$. In this case, it can be represented as $M_\delta := (M_j)_{\gamma(j)=1}$. Note that $M_j$ is row j of the matrix M.

In functional encryption, each variable p of the set of variables in the access structure S is defined by a tuple $(t, v_i)$ of an identifier t and a vector $v_i$. When an attribute set Γ which is a tuple $(t, x_t)$ of the identifier t and a vector $x_t$ is given to the access structure S, the map γ(i) is defined such that when $[\rho(i)=(t, v_i)] \wedge [(t, x_t) \in \Gamma] \wedge [v_i \cdot x_t = 0]$ or $[\rho(i)=\neg(t, v_i)] \wedge [(t, x_t) \in \Gamma] \wedge [v_i \cdot x_t \neq 0]$, then $\gamma(j)=1$; otherwise $\gamma(j)=0$.

That is, in functional encryption, the map γ(i) is computed based on the inner-product of the vector $v_i$ and the vector $x_t$. Then, as described above, which row of the secret distribution matrix M is included in the submatrix $M_\delta$ is decided by the map γ(i).

The access structure S accepts the attribute set Γ only if 1 is obtained as a result of linear combination of the rows of the submatrix $M_\delta$. Note that 1 is a row vector in which every element is 1.

For example, in the example of FIG. 2, the access structure S accepts the attribute set Γ only if 1 is obtained as a result of linear combination of the rows of the submatrix $M_\delta$ consisting of the first, second, and fourth rows of the secret distribution matrix M. That is, the access structure S accepts the attribute set Γ if there exist coefficients $\alpha_1$, $\alpha_2$, and $\alpha_4$ with which $\alpha_1(M_1)+\alpha_2(M_2)+\alpha_4(M_4)=1$.

In other words, when the set of the row numbers of the secret distribution matrix included in the submatrix $M_\delta$ is defined as I, the access structure S accepts the attribute set Γ if there exists a coefficient $\alpha_i$ with which $\Sigma_{i\in I}\alpha_i M_i=1$.

In ciphertext-policy functional encryption, a key element $k^*_t$ in which a vector $x_t$ is set is generated for the identifier t included in the attribute set Γ representing the attribute of the user. Then, a user secret key $sk_\Gamma$ which includes the key element $k^*_t$ for each identifier t included in the attribute set Γ and t=0 is generated.

The identifier t is related to an attribute category and an attribute in the attribute category related to the identifier t is set in the vector $x_t$. The attribute category is a classification of attributes, such as belonging department, gender, and age. For example, when the identifier t is related to the belonging department, a value indicating the belonging department of the user of the user secret key $sk_1$ is set in the vector $x_t$.

In ciphertext-policy functional encryption, a distributed value $s_i$ of secret distribution is assigned to row i in the secret distribution matrix M of the access structure S for each integer i=1, . . . , L. Then, a cipher element $c_i$ in which the assigned distributed value $s_i$ and a vector $v_i$ are set is generated for each row i of the secret distribution matrix M. A cipher element $c_0$ in which a secret value $s_0$ computed from the set of the distributed value $s_i$ satisfying a condition is also generated. A cipher element $c_{d+1}$ in which a message m is encrypted using a session key K is also generated. Then, an original ciphertext $ct_s$ which includes the cipher element $c_i$ for each integer i=0, L, d+1 and the access structure S is generated.

In ciphertext-policy functional encryption, a pairing operation is performed on the key element $k^*_t$ for the identifier t included in the attribute set Γ and the cipher element $c_i$ identified by the label ρ(i) having the identifier t. By performing the pairing operation, the inner-product of the vector $v_i$ and the vector $x_t$ is computed, and the map γ(i) is computed. Then, which row of the secret distribution matrix M is included in the submatrix $M_\delta$ is decided.

Then, if the access structure S accepts the attribute set Γ, the set of the distributed value $s_i$ satisfying the condition is extracted and the secret value $s_0$ is computed. The session key K is generated from the key element $k^*_0$, the cipher element $c_0$, and the secret value $s_0$. The message m is computed with the session key K.

FIG. 3 is an explanatory drawing of the secret value $s_0$ of secret distribution.

The secret value $s_0$ is a sum of elements of a product of a row vector having 1 in all of r elements and a column vector f having r elements $f_1, \ldots, f_r$. Note that each element of the column vector f is a uniform random number.

FIG. 4 is an explanatory drawing of the distributed values $s_1, \ldots, s_L$ of secret distribution.

The distributed values $s_1, \ldots, s_L$ are a product of the secret distribution matrix M and the column vector f. A column vector $s^T$ is a vector whose elements are the distributed values $s_1, \ldots, s_L$.

As described above, if the access structure S accepts the attribute set Γ, there exists the coefficient $\alpha_i$ with which $\Sigma_{i\in I}\alpha_i M_i=1$. The coefficient $\alpha_i$ can be computed in polynomial time in the size of the secret distribution matrix M.

Then, when the coefficient $\alpha_i$ is used, $\Sigma_{i\in I}\alpha_i s_i=s_0$ is obtained according to the definitions of the secret value $s_0$ and the distributed values $s_1, \ldots, s_L$.

An overview of the technique for restricting the decryption condition of the ciphertext will be described.

As described above, the original ciphertext $ct_s$ includes the cipher element $c_0$ in which the secret value $s_0$ is set, the cipher element $c_i$ for each integer i=1, . . . , L in which the distributed value $s_i$ and the vector $v_i$ are set, the cipher element $c_{d+1}$ in which the message m is encrypted, and the access structure S.

Then, the decryption condition of the original ciphertext $ct_s$ is specified by the secret distribution matrix M included in the access structure S and the cipher element $c_i$ which is set for each row of the secret distribution matrix M.

In the first embodiment, the decryption condition of the original ciphertext $ct_s$ is restricted by adding a row and a column to the secret distribution matrix M included in the original ciphertext $ct_s$ and adding a cipher element $c_i$ related to the added row.

Figure 5:
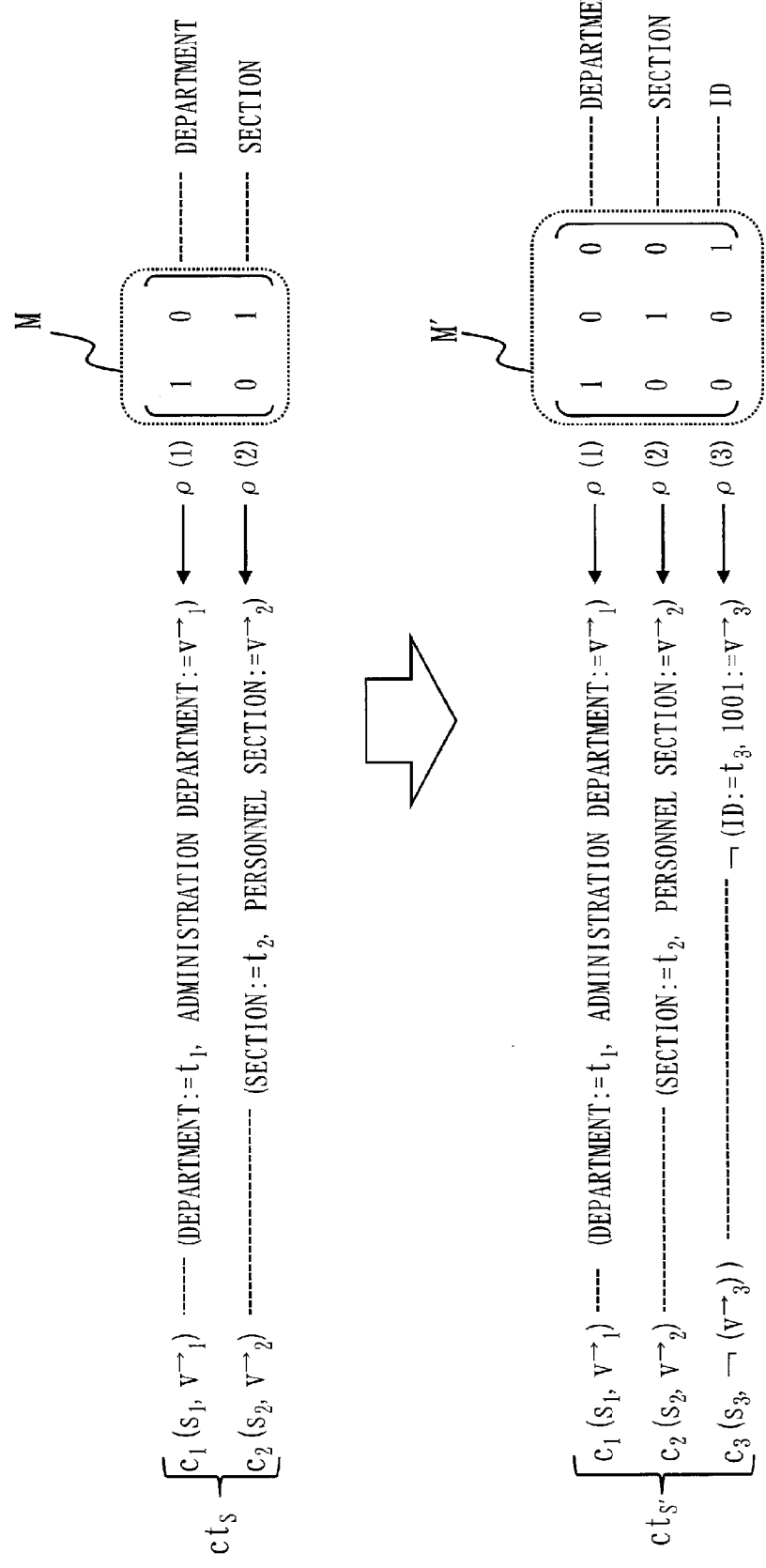
FIG. 5 is an explanatory drawing of an example of restricting a decryption condition of a ciphertext.

FIG. 5 is an explanatory drawing of an example of restricting the decryption condition of the ciphertext.

In the original ciphertext $ct_s$, (department=administration department) AND (section=personnel section) is set as the decryption condition.

In this case, the secret distribution matrix M has two rows and two columns, and the first row is related to the department and the second row is related to the section. Then, the label ρ(1) of the first row is related to a positive tuple (department:=$t_1$, administration department:=$v_1$), and the label ρ(2) of the second row is related to a positive tuple (section:=$t_2$, personnel section:=$v_2$).

The distributed value $s_1$ and administration department:=$v_1$ are set in the cipher element $c_1$ related to the first row of the secret distribution matrix M, and the distributed value $s_2$ and personnel section:=$v_2$ are set in the cipher element $c_2$ related to the second row.

Assume here, for example, that the user secret key $sk_\Gamma$ of the user with ID=1001 needs to be invalidated. In this case, ID=1001 may be removed from the decryption condition. This can be realized by adding NOT (ID=1001) as an AND condition to the decryption condition of the original ciphertext $ct_s$.

That is, the decryption condition may be set as (department=administration department) AND (section=personnel section) AND (NOT (ID=1001)).

Therefore, in an updated ciphertext $ct_{s'}$ which is the updated original ciphertext $ct_s$, the third row and the third column are added to the secret distribution matrix M, and the third row is related to the user ID. Then, the label ρ(3) of the third row is related to a negative tuple (ID:=$t_3$, 1001:=$v_3$).

The distributed value $s_3$ and 1001:=$v_3$ in negative form are set in the cipher element $c_3$ related to the third row of the secret distribution matrix M.

With this arrangement, the decryption condition can be set as (department=administration department) AND (section=personnel section) AND (NOT (ID=1001)).

*Description of Configuration*

Figure 6:
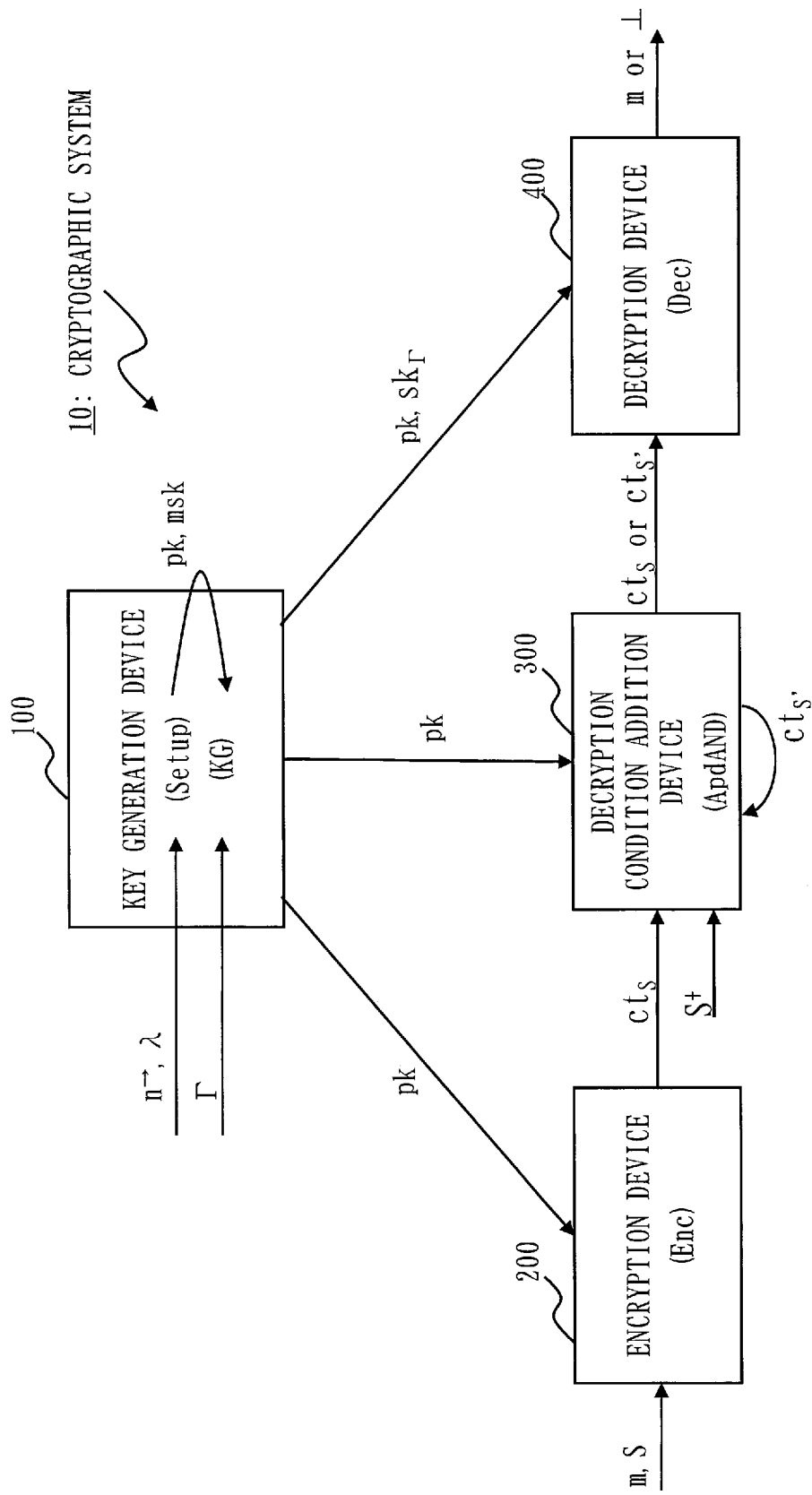
FIG. 6 is a configuration diagram of a cryptographic system 10 according to a first embodiment.

FIG. 6 is a configuration diagram of a cryptographic system 10 according to the first embodiment.

The cryptographic system 10 has a key generation device 100, an encryption device 200, a decryption condition addition device 300, and a decryption device 400.

The key generation device 100 executes a Setup algorithm taking as input an attribute format n and a security parameter λ, and thereby generates a public key pk and a master secret key msk. The key generation device 100 also executes a KG algorithm taking as input the public key pk, the master secret key msk, and a user attribute set Γ, and thereby generates a user secret key sky.

Then, the key generation device 100 publishes the public key pk. The key generation device 100 outputs the user secret key sky to the decryption device 400 in secrecy.

The encryption device 200 executes an Enc algorithm taking as input the public key pk, an access structure S, and a message m, and thereby generates an original ciphertext $ct_s$ in which the message m is encrypted and a secret distribution matrix M is set as information specifying a decryption condition. The encryption device 200 outputs the original ciphertext $ct_s$ to the decryption condition addition device 300.

The decryption condition addition device 300 executes an ApdAND algorithm taking as input the public key pk, the original ciphertext $ct_s$, and an additional access structure $S^+$, and thereby generates an updated ciphertext $ct_{s'}$ for which the decryption condition of the original ciphertext $ct_s$ is restricted. If the updated ciphertext $ct_{s'}$ has been generated, the decryption condition addition device 300 outputs the updated ciphertext $ct_{s'}$ to the decryption device 400. If the updated ciphertext $ct_{s'}$ has not been generated, the decryption condition addition device 300 outputs the original ciphertext $ct_s$ to the decryption device 400.

Specifically, the decryption condition addition device 300 acquires the additional access structure $S^+$ which is a restriction condition to restrict the decryption condition of the original ciphertext $ct_s$ generated by the encryption device 200, and adds a row and a column which are related to the restriction condition to the secret distribution matrix M being set in the original ciphertext $ct_s$, and thereby generates the updated ciphertext $ct_{s'}$ for which the decryption condition of the original ciphertext $ct_s$ is restricted.

The decryption device 400 executes a Dec algorithm taking as input the public key pk, the user secret key $sk_\Gamma$, and the original ciphertext $ct_s$ generated by the encryption device 200 or the updated ciphertext $ct_{s'}$ generated by the decryption condition addition device 300, and thereby decrypts the original ciphertext $ct_s$ generated by the encryption device 200 or the updated ciphertext $ct_{s'}$ generated by the decryption condition addition device 300. The decryption device 400 outputs the message m or a symbol ⊥ indicating a decryption failure.

Figure 7:
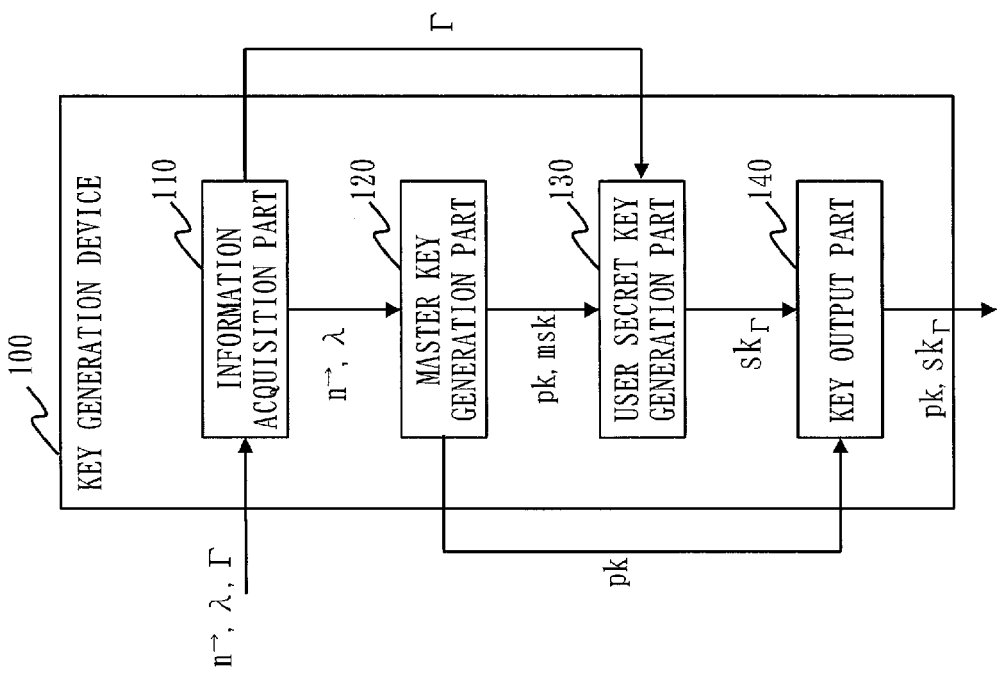
FIG. 7 is a configuration diagram of a key generation device 100 according to the first embodiment.

FIG. 7 is a configuration diagram of the key generation device 100 according to the first embodiment.

The key generation device 100 has an information acquisition part 110, a master key generation part 120, a user secret key generation part 130, and a key output part 140.

The information acquisition part 110 acquires an attribute format n, a security parameter λ, and an attribute set Γ which are input by an administrator of the cryptographic system 10. The master key generation part 120 generates a master secret key msk and a public key pk based on the attribute format n and the security parameter λ acquired by the information acquisition part 110. The user secret key generation part 130 generates a user secret key $sk_\Gamma$ based on the attribute set Γ acquired by the information acquisition part 110 and the master secret key msk and the public key pk generated by the master key generation part 120. The key output part 140 outputs the public key pk to a server for publication or the like so as to publish the public key pk, and outputs in secrecy the user secret key $sk_\Gamma$ to the decryption device 400 used by the user. Outputting in secrecy means, for example, transmitting after encrypting by an existing encryption scheme.

Figure 8:
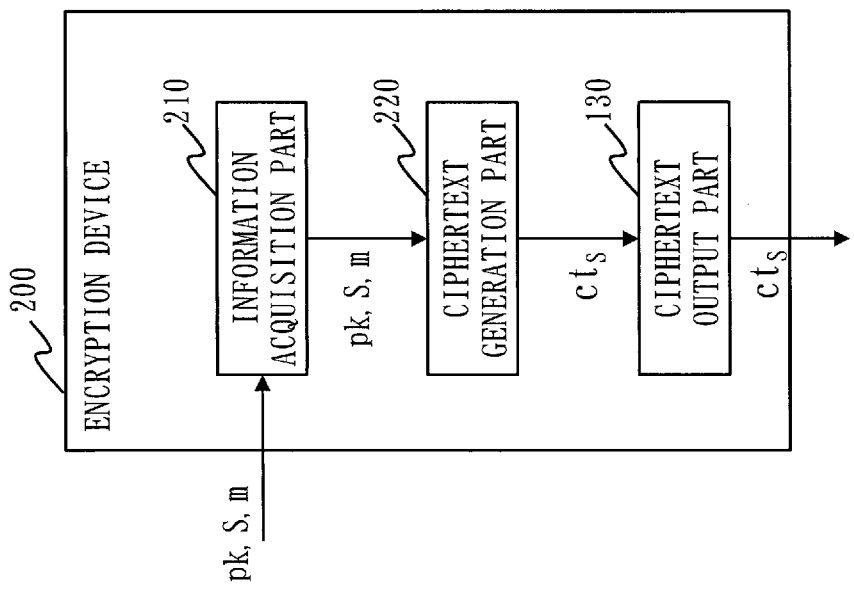
FIG. 8 is a configuration diagram of an encryption device 200 according to the first embodiment.

FIG. 8 is a configuration diagram of the encryption device 200 according to the first embodiment.

The encryption device 200 has an information acquisition part 210, a ciphertext generation part 220, and a ciphertext output part 230.

The information acquisition part 210 acquires the public key pk generated by the key generation device 100 as well as an access structure S and a message m which are input by the user of the encryption device 200. The ciphertext generation part 220 generates an original ciphertext $ct_s$ in which the message m is encrypted based on the public key pk, the access structure S, and the message m acquired by the information acquisition part 210. The ciphertext output part 230 outputs the original ciphertext $ct_s$ generated by the ciphertext generation part 220 to the decryption condition addition device 300.

Figure 9:
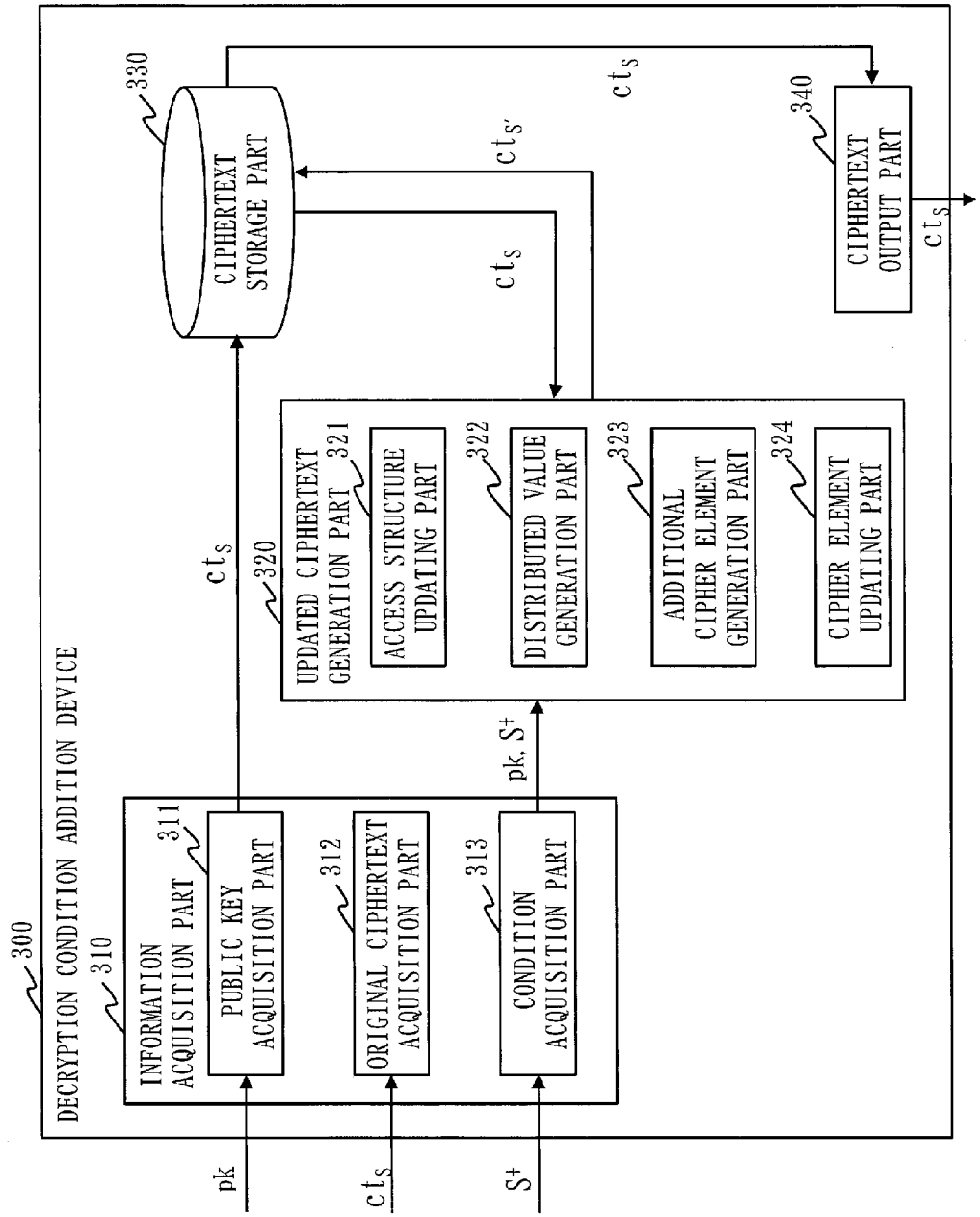
FIG. 9 is a configuration diagram of a decryption condition addition device 300 according to the first embodiment.

FIG. 9 is a configuration diagram of the decryption condition addition device 300 according to the first embodiment.

The decryption condition addition device 300 has an information acquisition part 310, an updated ciphertext generation part 320, a ciphertext storage part 330, and a ciphertext output part 340.

The information acquisition part 310 has a public key acquisition part 311, an original ciphertext acquisition part 312, and a condition acquisition part 313.

The public key acquisition part 311 acquires the public key pk generated by the key generation device 100. The original ciphertext acquisition part 312 acquires the original ciphertext $ct_s$ generated by the encryption device 200. The condition acquisition part 313 acquires an additional access structure $S^+$ which is a restriction condition to restrict the decryption condition of the original ciphertext $ct_s$.

The updated ciphertext generation part 320 generate an updated ciphertext $ct_{s'}$ by restricting the decryption condition of the original ciphertext $ct_s$ acquired by the original ciphertext acquisition part 312 with the additional access structure $S^+$ acquired by the condition acquisition part 313, based on the public key pk acquired by the public key acquisition part 311.

The updated ciphertext generation part 320 has an access structure updating part 321, a distributed value generation part 322, an additional cipher element generation part 323, and a cipher element updating part 324.

The ciphertext storage part 330 is a storage device to store the original ciphertext $ct_s$ acquired by the original ciphertext acquisition part 312. If the updated ciphertext generation part 320 has generated the updated ciphertext $ct_{s'}$ from the original ciphertext $ct_s$, the ciphertext storage part 330 deletes the original ciphertext $ct_s$ and stores the updated ciphertext $ct_{s'}$.

If requested by the decryption device 400, the ciphertext output part 340 outputs the original ciphertext $ct_s$ or the updated ciphertext $ct_{s'}$ stored in the ciphertext storage part 330 to the decryption device 400.

Figure 10:
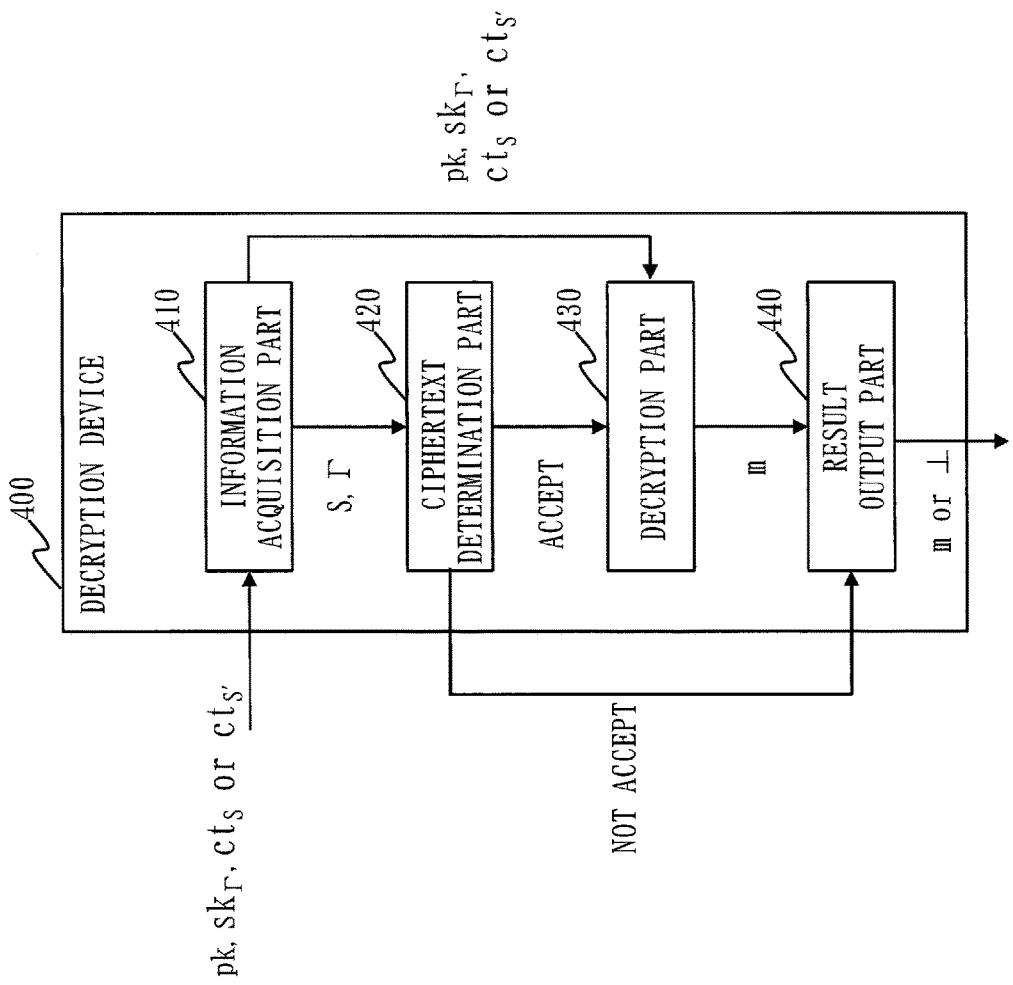
FIG. 10 is a configuration diagram of a decryption device 400 according to the first embodiment.

FIG. 10 is a configuration diagram of the decryption device 400 according to the first embodiment.

The decryption device 400 has an information acquisition part 410, a ciphertext determination part 420, a decryption part 430, and a result output part 440.

The information acquisition part 410 acquires the public key pk and the user secret key $sk_\Gamma$ generated by the key generation device 100 and either one of the original ciphertext $ct_s$ generated by the encryption device 200 and the updated ciphertext $ct_{s'}$ generated by the decryption condition addition device 300. The ciphertext determination part 420 determines whether or not the ciphertext acquired by the information acquisition part 410 can be decrypted with the user secret key $sk_\Gamma$. If the ciphertext determination part 420 has determined, based on the public key pk, that decryption is possible, the decryption part 430 decrypts the ciphertext acquired by the information acquisition part 410 with the user secret key $sk_1$. If the ciphertext determination part 420 has determined that decryption is possible, the result output part 440 outputs a result of decryption by the decryption part 430. If the ciphertext determination part 420 has determined that decryption is not possible, the result output part 440 outputs a symbol $\perp$ indicating a decryption failure.

\*\*\*Description of Operation\*\*\*

Figure 11:
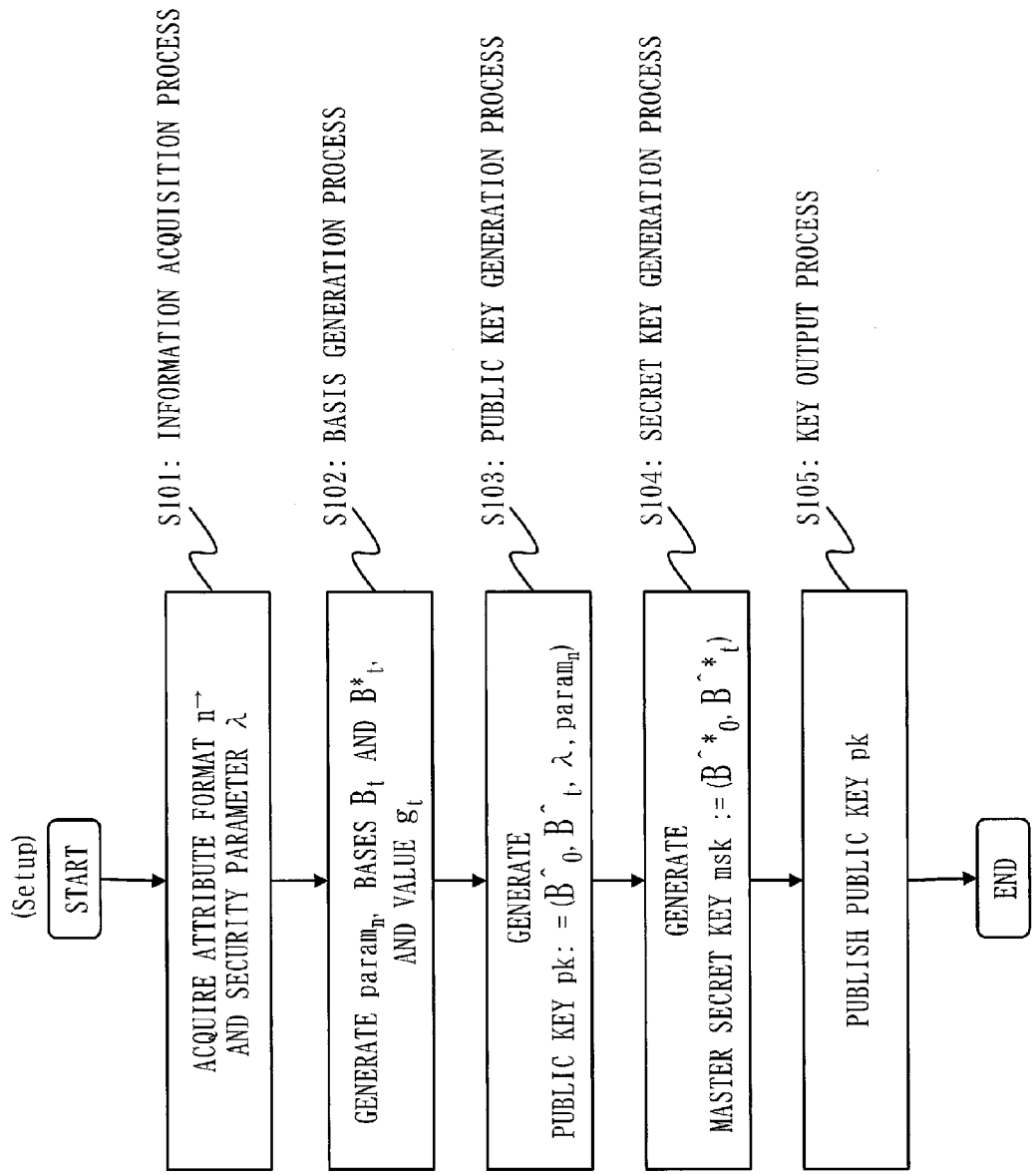
FIG. 11 is a flowchart of a Setup algorithm according to the first embodiment.

FIG. 11 is a flowchart of the Setup algorithm according to the first embodiment.

The Setup algorithm is executed by the key generation device 100.

(S101: Information Acquisition Process)

The information acquisition part 110 acquires an attribute format $n:=(d; n_1, \ldots, n_d)$ and a security parameter $\lambda$ which are input by the administrator or the like of the cryptographic system 10 with an input device.

(S102: Basis Generation Process)

The master key generation part 120 computes Formula 113 taking as input the attribute format n and the security parameter $\lambda$ acquired in S101, and thereby generates a parameter $param_n$ of dual pairing vector spaces, a basis $B_t$ and a basis $B^*_t$ for each integer $t=0, \ldots, d$, and a value $g_T$.

$$\mathcal{G}_{ob}(1^\lambda, \vec{n} = (d; n_1, \ldots, n_d)): param_{\mathbb{G}} :=$$

$$(q, \mathbb{G}, \mathbb{G}_T, g, e) \xleftarrow{R} \mathcal{G}_{bpg}(1^\lambda),$$

$$N_0 := 5, N_t := 3n_t + 1,$$

$$\psi \xleftarrow{U} \mathbb{F}_q^\times, g_T := e(g, g)^\psi,$$

for $t = 0, \ldots, d,$ $$param_{\mathbb{V}_t} := (q, \mathbb{V}_t, \mathbb{G}_T, \mathbb{A}_t, e) \xleftarrow{R} \mathcal{G}_{dpvs}(1^\lambda, N_t, param_{\mathbb{G}}),$$

$$X_t = \begin{pmatrix} \vec{x}_{t,1} \\ \vdots \\ \vec{x}_{t,N_t} \end{pmatrix} := (x_{t,i,j})_{i,j} \xleftarrow{U} GL(N_t, \mathbb{F}_q),$$

$$\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$

$$b_{t,i} := \sum_{j=1}^{N_t} x_{t,i,j} a_{t,j}, \mathbb{B}_t := (b_{t,1}, \ldots, b_{t,N_t}),$$

$$b^*_{t,i} := \sum_{j=1}^{N_t} v_{t,i,j} a_{t,j}, \mathbb{B}^*_t := (b^*_{t,1}, \ldots, b^*_{t,N_t}),$$

$$param_n := \{param_{\mathbb{V}_t}\}_{t=0,\ldots,d},$$

return $param_n, g_T, \{\mathbb{B}_t, \mathbb{B}^*_t\}_{t=0,\ldots,d}.$

[Formula 113]

Note that in Formula 113, $G_{bpg}$ is a function to generate a bilinear pairing group and $G_{dpvs}$ is a function to generate dual pairing vector spaces.

(S103: Public Key Generation Process)

The master key generation part 120 generates a subbasis $\hat{B}_0$ of the basis $B_0$ generated in S102 and a subbasis $\hat{B}_t$ for each integer $t=1, \ldots, d$, as indicated in Formula 114.

$$\hat{\mathbb{B}}_0 := (b_{0,1}, b_{0,2}, b_{0,5}),$$

$$\hat{\mathbb{B}}_t := (b_{t,1}, \ldots, b_{t,n_t}, b_{t,N_t}) \text{ for } t=1, \ldots, d$$

[Formula 114]

The master key generation part 120 generates a public key pk by putting together the subbasis $\hat{B}_0$, the subbasis $\hat{B}_t$, the security parameter $\lambda$ input in S101, and $param_n$ generated in S101.

(S104: Master Secret Key Generation Process)

The master key generation part 120 generates a subbasis $\hat{B}^*_0$ of the basis $B^*_0$ generated in S102 and a subbasis $\hat{B}^*_t$ for each integer $t=1, \ldots, d$, as indicated in Formula 115.

$$\hat{\mathbb{B}}^*_0 := (b^*_{0,1}, b^*_{0,2}, b^*_{0,4}),$$

$$\hat{\mathbb{B}}^*_t := (b^*_{t,1}, \ldots, b^*_{t,n_t}, b^*_{t,2n_t+1}, \ldots, b^*_{t,3n_t}) \text{ for } t=1, \ldots, d$$

[Formula 115]

The master key generation part 120 generates a master secret key msk constituted by the subbasis $\hat{B}^*_0$ and the subbasis $\hat{B}^*_t$.

(S105: Key Output Process)

The key output part 140 outputs the public key pk generated in S103 to the server for publication or the like so as to publish the public key pk.

Figure 12:
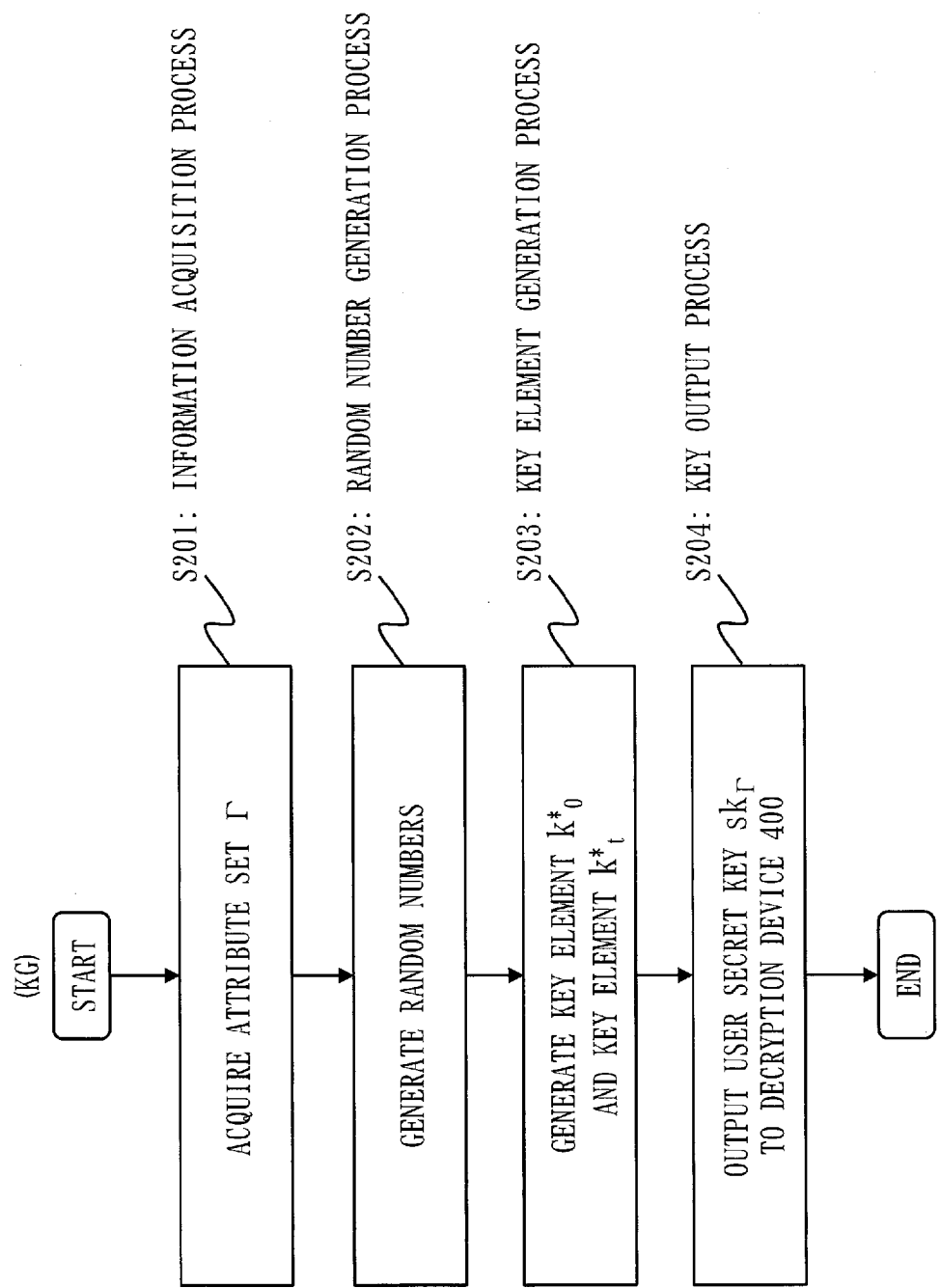
FIG. 12 is a flowchart of a KG algorithm according to the first embodiment.

FIG. 12 is a flowchart of the KG algorithm according to the first embodiment.

The KG algorithm is executed by the key generation device 100.

(S201: Information Acquisition Process)

The information acquisition part 110 acquires a user attribute set $\Gamma$ which is input by the administrator or the like of the cryptographic system 10 with an input device.

The attribute set $\Gamma$ is a tuple $(t, x_t)$ of an identifier t and a vector $x_t$. This identifier t is related to an attribute category, and an attribute in the attribute category related to the identifier t is set in the vector $x_t$.

(S202: Random Number Generation Process)

The user secret key generation part 130 generates random numbers, as indicated in Formula 116.

$$\delta, \varphi_0 \xleftarrow{U} \mathbb{F}_q,$$

$$\vec{\varphi}_t \xleftarrow{U} \mathbb{F}_q^{n_t} \text{ for } (t, \vec{x}_t) \in \Gamma$$

[Formula 116]

(S203: Key Element Generation Step)

The user secret key generation part 130 generates a key element $k^*_0$ and a key element $k^*_t$ for each identifier t included in the attribute set $\Gamma$, based on the attribute set $\Gamma$ acquired in S201 and the random numbers generated in S202, as indicated in Formula 117.

$$k^*_0 := (1, \delta, 0, \varphi_0, 0)_{\mathbb{B}^*_0},$$

$$k^*_t := \left( \overbrace{\delta \vec{x}_t}^{n_t}, \overbrace{0^{n_t}}^{n_t}, \overbrace{\vec{\varphi}_t}^{n_t}, \overbrace{0}^{1} \right)_{\mathbb{B}^*_t} \text{ for } (t, \vec{x}_t), \in \Gamma$$

[Formula 117]

As indicated in Formula 117, a vector x indicating the attribute in the attribute category related to the identifier t is set in the key element $k^*_t$ for each identifier t.

(S204: Key Output Process)

The key output part 140 outputs in secrecy a user secret key $sk_\Gamma$ which includes the attribute set $\Gamma$ acquired in S201 as well as the key element $k^*_0$ and the key element $k^*_t$ for each integer t included in the attribute set $\Gamma$ generated in S203 to the decryption device 400 used by the user of the user secret key $sk_\Gamma$.

Figure 13:
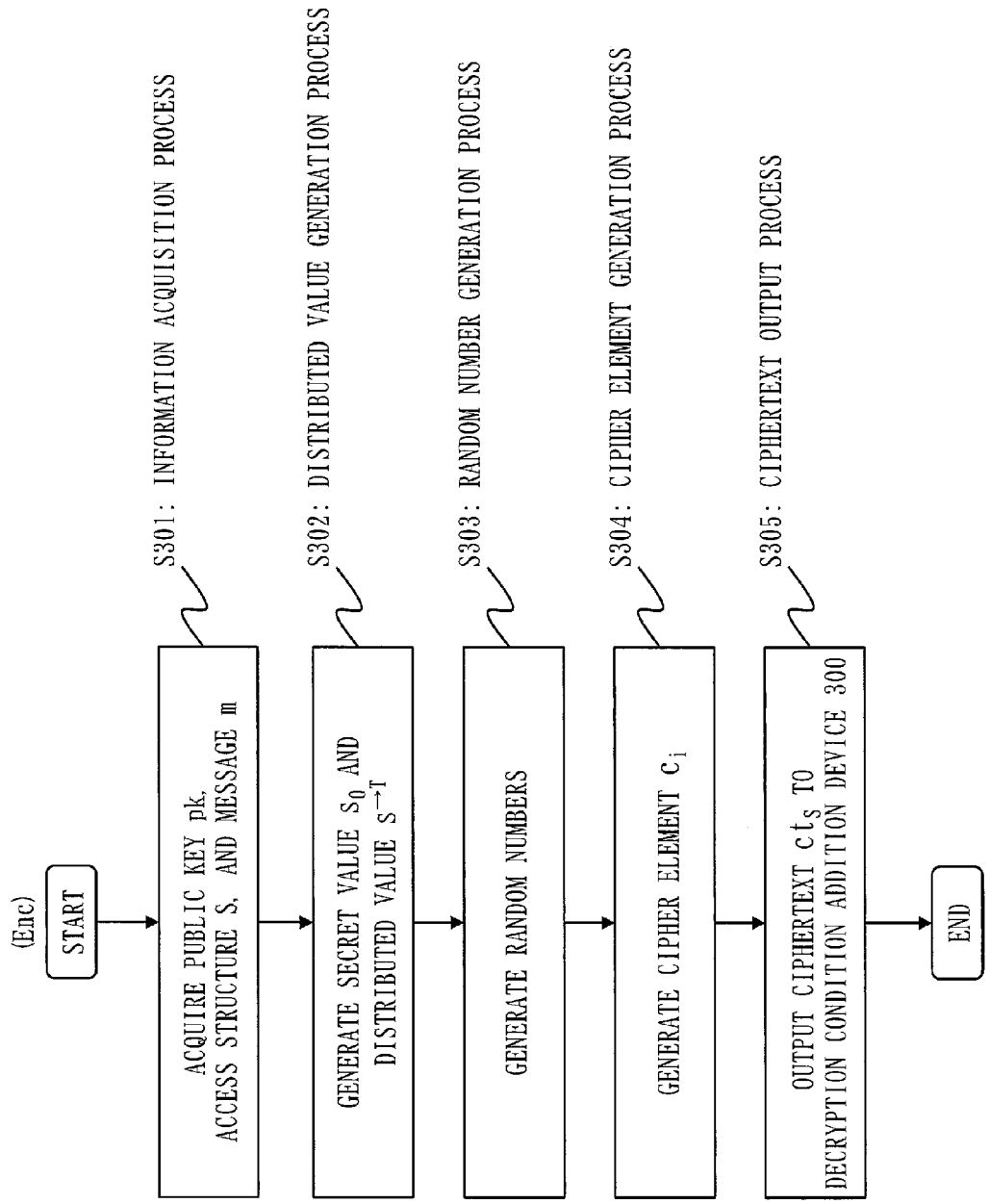
FIG. 13 is a flowchart of an Enc algorithm according to the first embodiment.

FIG. 13 is a flowchart of the Enc algorithm according to the first embodiment.

The Enc algorithm is executed by the encryption device 200.

(S301: Information Acquisition Process)

The information acquisition part 210 acquires the public key pk generated by the key generation device 100 and an access structure S:=(M, ρ) and a message m which are input by the user of the encryption device 200 with an input device.

In the access structure S, the decryption condition of the original ciphertext $ct_s$ is set with the secret distribution matrix M and the label ρ.

(S302: Distributed Value Generation Process)

The ciphertext generation part 220 generates a secret value $s_0$ and a distributed value $s^T$, as indicated in Formula 118.

[Formula 118]

$$\vec{f} \xleftarrow{U} \mathbb{F}_q^r,$$

$$\vec{s}^T := (s_1, \ldots, s_L)^T := M \cdot \vec{f},$$

$$\vec{s}_0 := \vec{1} \cdot \vec{f}^T$$

(S303: Random Number Generation Process)

The ciphertext generation part 220 generates random numbers, as indicated in Formula 119.

[Formula 119]

$$\eta_0, \zeta \xleftarrow{U} \mathbb{F}_q,$$

$$\theta_i, \eta_i \xleftarrow{U} \mathbb{F}_q \text{ for } i = 1, \ldots, L$$

(S304: Cipher Element Generation Process)

The ciphertext generation part 220 generates a cipher element $c_i$ for each integer i=0, . . . , L, d+1, as indicated in Formula 120.

[Formula 120]

$$c_0 := (\zeta, -s_0, 0, 0, \eta_0)_{\mathbb{B}_0},$$

for $i = 1, \ldots, L$, if $\rho(i) = (t, \vec{v}_i)$, $c_i := \left( \overbrace{s_i \vec{e}_{t,1} + \theta_i \vec{v}_i}^{n_t}, \overbrace{0^{n_t}}^{n_t}, \overbrace{0^{n_t}}^{n_t}, \overbrace{\eta_i}^{1} \right)_{\mathbb{B}_t},$ if $\rho(i) = \neg (t, \vec{v}_i)$, $c_i := \left( \overbrace{s_i \vec{v}_i}^{n_t}, \overbrace{0^{n_t}}^{n_t}, \overbrace{0^{n_t}}^{n_t}, \overbrace{\eta_i}^{1} \right)_{\mathbb{B}_t},$ $c_{d+1} := m \cdot g_T^\zeta$ As indicated in Formula 120, the secret value $s_0$ is set in the cipher element $c_0$. The distributed value $s_i$ and a vector $v_i$ are set in the cipher element $c_i$ for each integer i=1, . . . , L. How a value is set in the cipher element $c_i$ varies depending on whether the label ρ(i) is related to positive (t, $v_i$) or related to negative ¬ (t, $v_i$). In the cipher element $c_{d+1}$, the message m is encrypted with the session key K.

(S305: Ciphertext Output Process)

The ciphertext output part 230 outputs an original ciphertext $ct_s$ which includes the access structure S acquired in S301 and the cipher element $c_i$ for each integer i=0, . . . , L, d+1 generated in S304 to the decryption condition addition device 300.

Figure 14:
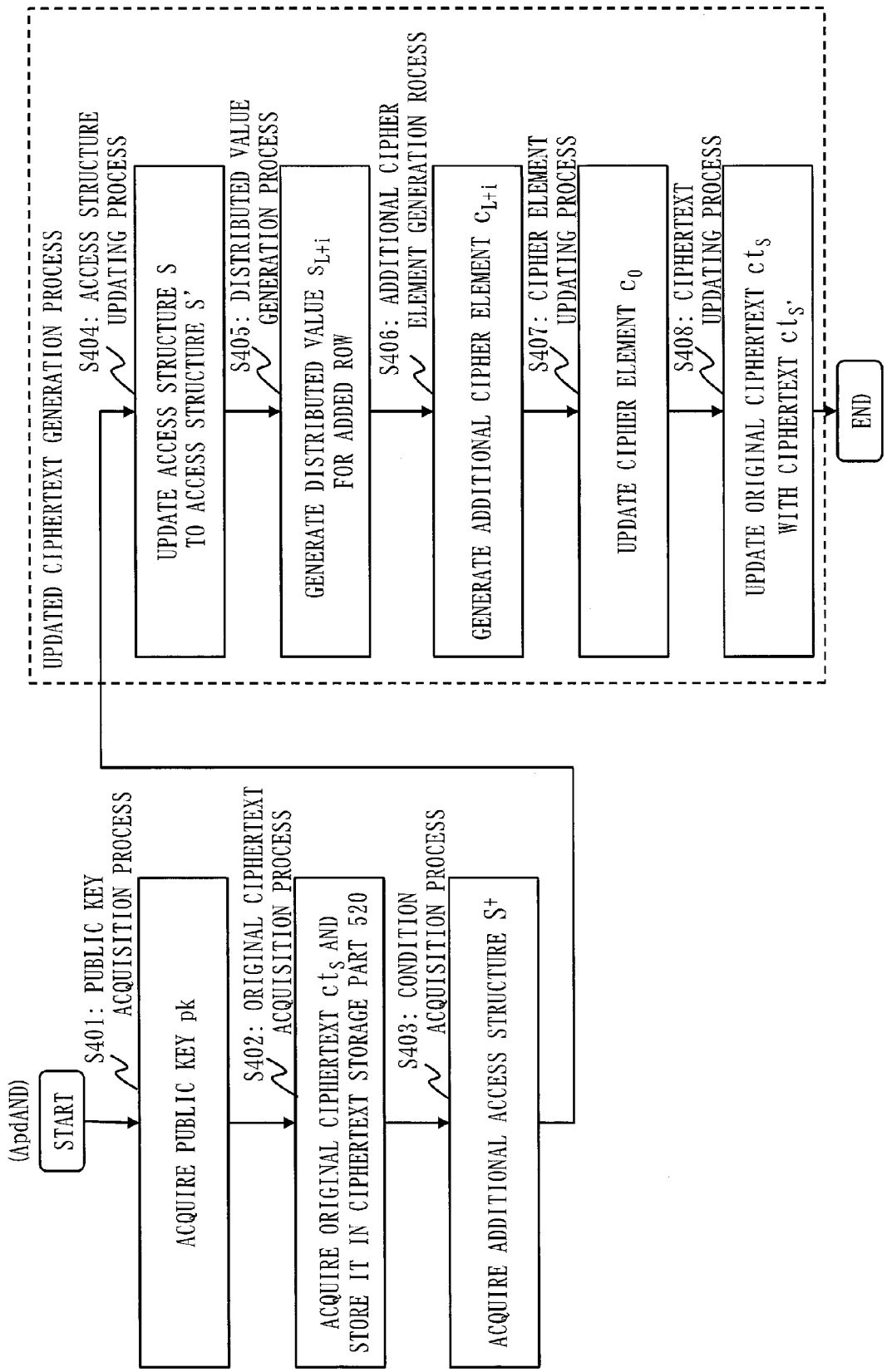
FIG. 14 is a flowchart of an ApdAND algorithm according to the first embodiment.

FIG. 14 is a flowchart of the ApdAND algorithm according to the first embodiment.

The ApdAND algorithm is executed by the decryption condition addition device 300.

(S401: Public Key Acquisition Process)

The public key acquisition part 311 acquires the public key pk generated by the key generation device 100.

(S402: Original Ciphertext Acquisition Process)

The original ciphertext acquisition part 312 acquires the original ciphertext $ct_s$ generated by the encryption device 200. As described above, in the original ciphertext $ct_s$, the access structure S which includes the secret distribution matrix M and the label ρ is set as the information specifying the decryption condition. In the original ciphertext $ct_s$, the cipher element $c_i$ indicating an attribute is also set for each row of the secret distribution matrix M, as the information specifying the decryption condition, in addition to the access structure S which includes the secret distribution matrix M and the label ρ.

The acquired original ciphertext $ct_s$ is stored in the ciphertext storage part 330.

(S403: Condition Acquisition Process)

The condition acquisition part 313 acquires an additional access structure $S^+$ which is a restriction condition to restrict the decryption condition of the original ciphertext $ct_s$ acquired by the original ciphertext acquisition part 312.

The additional access structure $S^+$ includes an additional matrix $M^+$ in which values are set only in elements of the row and column to be added to the secret distribution matrix M included in the access structure S and includes the label ρ(L+i) given to the added row.

Figure 15:
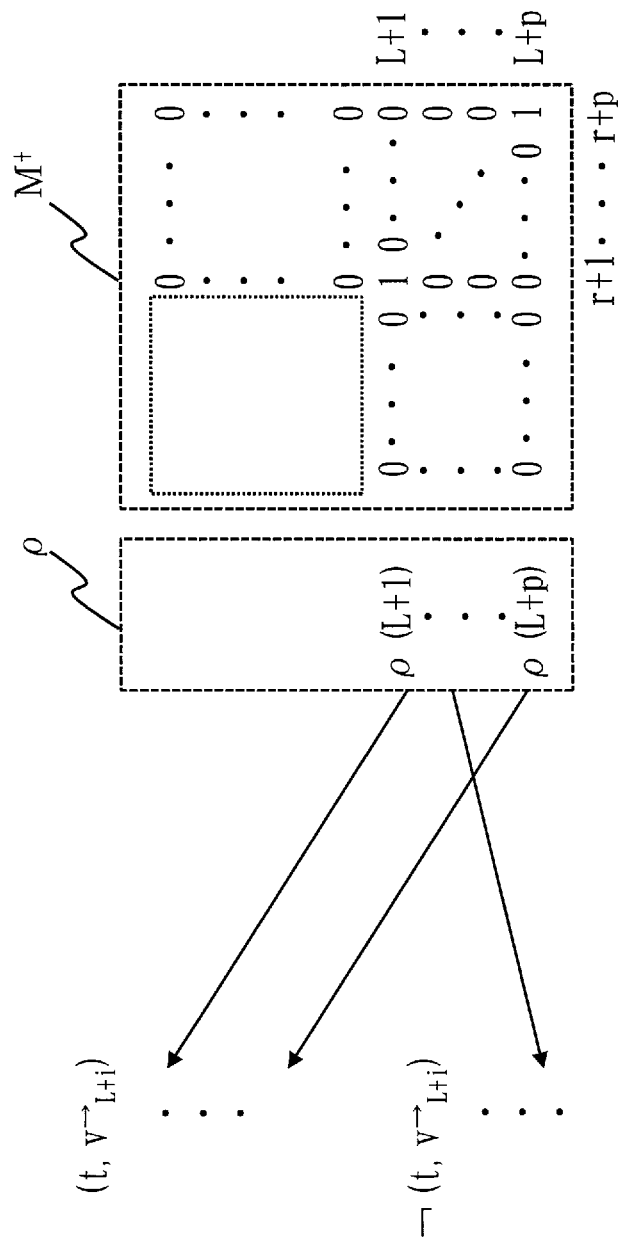
FIG. 15 is an explanatory drawing of an additional access structure $S^+$.

FIG. 15 is an explanatory drawing of the additional access structure S.

FIG. 15 illustrates a case where rows L+1 to L+p and columns r+1 to r+p are added.

In the additional matrix $M^+$, an element at row L+i and column r+i for each integer i=1, . . . , p is 1 and other elements are 0.

For each integer i=1, . . . , p, the label ρ(L+i) is given to row L+i. The label ρ(L+i) is related to one of literals ((t, $v_{L+i}$), (t', $v_{L+i}$), . . . , ¬ (t, $v_{L+i}$), and ¬ (t', $v_{L+i}$), . . . ). That is, each label ρ(L+i) is related to a tuple of the identifier t indicating an attribute category and the vector $v_{L+i}$ representing an attribute in the attribute category indicated by the identifier t.

A case will be described here, where the updated ciphertext generation part 320 adds one row and one column for one restriction condition, and then arranges the elements of the added row such that elements other than an element at the added column are 0, and arranges the elements of the added column such that elements other than an element at the added row are 0. Specifically, as illustrated in FIG. 15, a case will be described, where when adding rows L+1 to L+p and columns r+1 to r+p, where L, r, and p are positive integers, the updated ciphertext generation part 320 arranges the elements of the added row and column such that the element at row L+i and column r+i for each integer i=1, . . . , p is 1 and other elements are 0.

However, the number of rows to be added and the number of columns to be added are set according to the design of the access structure, and may be other than one for one restriction condition. Similarly, the values assigned to the elements of the added row and column are to be set according to the design of the access structure, and may be decided arbitrarily according to the design of the access structure.

In the additional matrix $M^-$ in the additional access structure $S^+$, only the number p of rows and columns to be added may be set, and the values of the elements of the added row and column may not need to be set. This is because 1 is set in the element at row L+i and column r+i for each integer i=1, . . . , p and 0 is set in other elements, so that it is sufficient that the number p of rows and columns to be added be known.

(S404: Access Structure Updating Process)

The access structure updating part 321 adds row L+i and column r+i for each integer i=1, . . . , p, indicated in the additional matrix $M^+$ of the additional access structure $S^+$ acquired in S403, to the secret distribution matrix M of the access structure S included in the original ciphertext $ct_s$ acquired in S402, and thereby generates a secret distribution matrix M'. The access structure updating part 321 also gives the label $\rho(L+i)$ of the additional access structure $S^+$ to the added row L+i for each integer i=1, . . . , p of the secret distribution matrix M'.

In this way, the access structure updating part 321 updates the access structure $S:=(M, \rho)$ to the access structure $S':=(M', \rho')$.

(S405: Distributed Value Generation Process)

The distributed value generation part 322 generates a distributed value $s_i$ for each integer i=L+1, . . . , L+p, as indicated in Formula 121.

$$s_i \xleftarrow{R} \mathbb{F}_q \text{ for } i = L + 1, \ldots, L + p \qquad \text{[Formula 121]}$$

(S406: Additional Cipher Element Generation Process)

The additional cipher element generation part 323 generates an additional cipher element $c_i$ for each integer i= L+1, . . . , L+p, based on the public key pk acquired in S401 and the distributed value $s_{L+i}$ generated in S405, as indicated in Formula 122.

[Formula 122]

for $i = L + 1, \ldots, L + p$, if $\rho(i) = (t, \vec{v_i}), \theta_i, \eta_i, \xleftarrow{U} \mathbb{F}_q,$ $c_i := (\overbrace{s_i \vec{e}_{t,1} + \theta_i \vec{v_i}}^{n_t}, \overbrace{0^{n_t}}^{n_t}, \overbrace{0^{n_t}}^{n_t}, \overbrace{\eta_i}^{1})_{\mathbb{B}_t},$ if $\rho(i) = \neg(t, \vec{v_i}), \eta_i, \xleftarrow{U} \mathbb{F}_q,$ $c_i := (\overbrace{s_i \vec{v_t}}^{n_t}, \overbrace{0^{n_t}}^{n_t}, \overbrace{0^{n_t}}^{n_t}, \overbrace{\eta_i}^{1})_{\mathbb{B}_t},$ (S407: Cipher Element Updating Process)

The cipher element updating part 324 updates the cipher element $c_0$ included in the original ciphertext $ct_s$ acquired in S402, based on the public key pk acquired in S401 and the distributed value $s_{L+i}$ of the additional access structure $S^+$ acquired in S403, as indicated in Formula 123.

$$c_0' := c_0 + (0, -\Sigma_{i=L+1}^{L+p} s_i, 0, 0, 0)_{\mathbb{B}_0} \qquad \text{[Formula 123]}$$

As indicated in Formula 123, by updating the cipher element $c_0$, the secret value $s_0$ is updated with the added distributed value $s_{L+i}$.

The distributed value $s_{L+i}$ for each integer i=1, . . . , p is added to the secret value $s_0$ here. However, the method for updating the secret value $s_0$ depends on the structure of the secret distribution matrix M'. Since it is arranged here that the element at row L+i and column r+i for each integer i=1, . . . , p is 1 and other elements are 0 in the additional matrix $M^+$, consistency is achieved by adding the distributed value $s_{L+i}$ for each integer i=1, . . . , p to the secret value $s_0$.

(S408: Ciphertext Updating Process)

The ciphertext storage part 330 stores an updated ciphertext $ct_{s'}$ which includes the access structure S' updated in S404, the cipher element $c_i$ for each integer i=1, . . . , L included in the original ciphertext $ct_s$ acquired in S402, the additional cipher element $c_{L+i}$ for each integer i=1, . . . , p generated in S406, and the cipher element $c_0$ updated in S407, by overwriting the original ciphertext $ct_s$.

If requested by the decryption device 400, the ciphertext output part 340 outputs the original ciphertext $ct_s$ or the updated ciphertext $ct_{s'}$ stored by the ciphertext storage part 330 to the decryption device 400.

The process from S404 to S408 will be collectively referred to as an updated ciphertext generation process.

In the updated ciphertext generation process, the updated ciphertext generation part 320 adds each row and column related to each restriction condition acquired by the condition acquisition process to the secret distribution matrix M set in the original ciphertext $ct_s$ acquired by the original ciphertext acquisition process. Then, the updated ciphertext generation part 320 additionally sets, for each added row, the cipher element $c_i$ which is related to an attribute category and in which an attribute in the attribute category is set, and thereby generates the updated ciphertext $ct_{s'}$ for which the decryption condition of the original ciphertext $ct_s$ is restricted.

Figure 16:
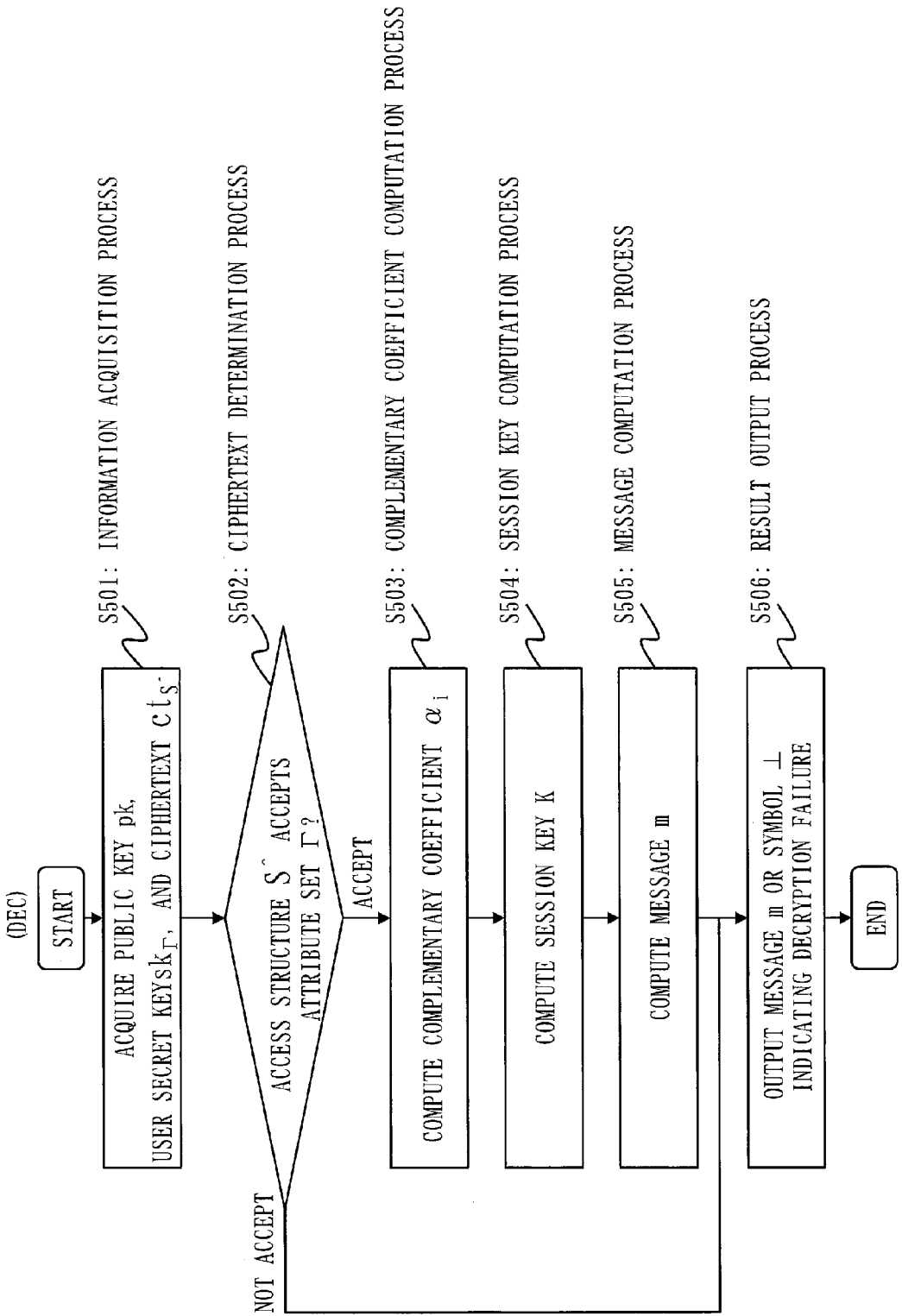
FIG. 16 is a flowchart of a Dec algorithm according to the first embodiment.

FIG. 16 is a flowchart of the Dec algorithm according to the first embodiment.

The Dec algorithm is executed by the decryption device 400.

(S501: Information Acquisition Process)

The information acquisition part 410 acquires the public key pk and the user secret key $sk_\Gamma$ generated by the key generation device 100.

The information acquisition part 410 outputs a request to the decryption condition addition device 300, and acquires a ciphertext $ct_{s^\wedge}$ from the decryption condition addition device 300. The ciphertext $ct_{s^\wedge}$ is the original ciphertext $ct_s$ or the updated ciphertext $ct_{s'}$. It is assumed here that the ciphertext $ct_{s^\wedge}$ includes an access structure $S^\wedge$ and a cipher element $c_i$ for each integer i=1, . . . , L', d+1.

(S502: Ciphertext Determination Process)

The ciphertext determination part 420 determines whether or not the access structure $S^\wedge$ included in the ciphertext $ct_{s^\wedge}$ acquired in S501 accepts the attribute set $\Gamma$ included in the user secret key $sk_\Gamma$ acquired in S501.

If the ciphertext determination part 420 determines acceptance, the ciphertext determination part 420 advances the process to S503. If the ciphertext determination part 420 determines non-acceptance, the ciphertext determination part 420 advances the process to S506.

(S503: Complementary Coefficient Computation Process)

The decryption part 430 computes a set I of row numbers and a complementary coefficient $\{\alpha_i\}_{i \in I}$ such as indicated in Formula 124.

$$\vec{1} = \sum_{i \in I} \alpha_i M_i \qquad \text{[Formula 124]}$$

where $M_i$ is the $i$-th row of $M$, and $I \subseteq$ $\{i \in \{1, \ldots, L\} | [\rho(i) = (t, \vec{v_i}) \wedge (t, \vec{x_t}) \in \Gamma \wedge \vec{v_i} \cdot \vec{x_t} = 0] \vee$ $[\rho(i) = \neg (t, \vec{v_i}) \wedge (t, \vec{x_t}) \in \Gamma \wedge \vec{v_i} \cdot \vec{x_t} \neq 0]\}$ (S504: Session Key Computation Process)

The decryption part 430 computes Formula 125 based on the ciphertext $ct_{s^\wedge}$ and the user secret key $sk_\Gamma$ acquired in S501 and the set I and the complementary coefficient $\{\alpha_i\}_{i\in I}$ computed in S503, and thereby computes a session key K.

$$K := e(c_0, k_0^*) \cdot \prod_{i\in I \wedge \rho(i)=(t,\vec{v}_i)} e(c_i, k_i^*)\alpha_i \cdot \prod_{i\in I \wedge \rho(i)=\neg(t,\vec{v}_i)} e(c_i, k_i^*)\alpha_i / (\vec{v}_i \cdot \vec{x}_i)$$ [Formula 125]

(S505: Message Computation Process)

The decryption part 430 divides the cipher element $c_{d+1}$ included in the ciphertext $ct_{s'}$ by the session key K computed in S504, and thereby computes the message m.

(S506: Result Output Process)

If acceptance is determined in S502, the result output part 440 outputs the message m computed in S505. If non-acceptance is determined in S502, the result output part 440 outputs a symbol ⊥ indicating a decryption failure.

*Description of Effects*

As described above, in the cryptographic system 10 according to the first embodiment, the decryption condition can be restricted by adding information to the access structure S included in the original ciphertext $ct_s$ and also adding the cipher element $c_i$.

Adding information to the access structure S and adding the cipher element $c_i$ can be implemented with only the ciphertext $ct_s$ and the public key pk, and a special key such as a re-encryption key is not required. Therefore, it is not necessary to use a re-encryption key to restrict the decryption condition of the original ciphertext $ct_s$.

When a particular user secret key is invalidated, for example, the decryption condition needs to be restricted promptly. In the cryptographic system 10 according to the first embodiment, the decryption condition can be restricted without generating a re-encryption key, so that the decryption condition can be restricted promptly.

In the above description, it has been described that the decryption condition of the original ciphertext $ct_s$ is restricted in the ApdAND algorithm. In the ApdAND algorithm, however, it is also possible to further restrict the decryption condition of the updated ciphertext $ct_{s'}$. In this case, the updated ciphertext $ct_{s'}$ may be acquired in S402, in place of the original ciphertext $ct_s$.

In the above description, the example of applying the technique for restricting the decryption condition of the ciphertext to ciphertext-policy functional encryption has been described. Ciphertext-policy attribute-based encryption also uses a secret distribution matrix. Therefore, the technique for restricting the decryption condition of the ciphertext by adding a row and a column to the secret distribution matrix, as described above, can also be applied to ciphertext-policy attribute-based encryption.

Figure 17:
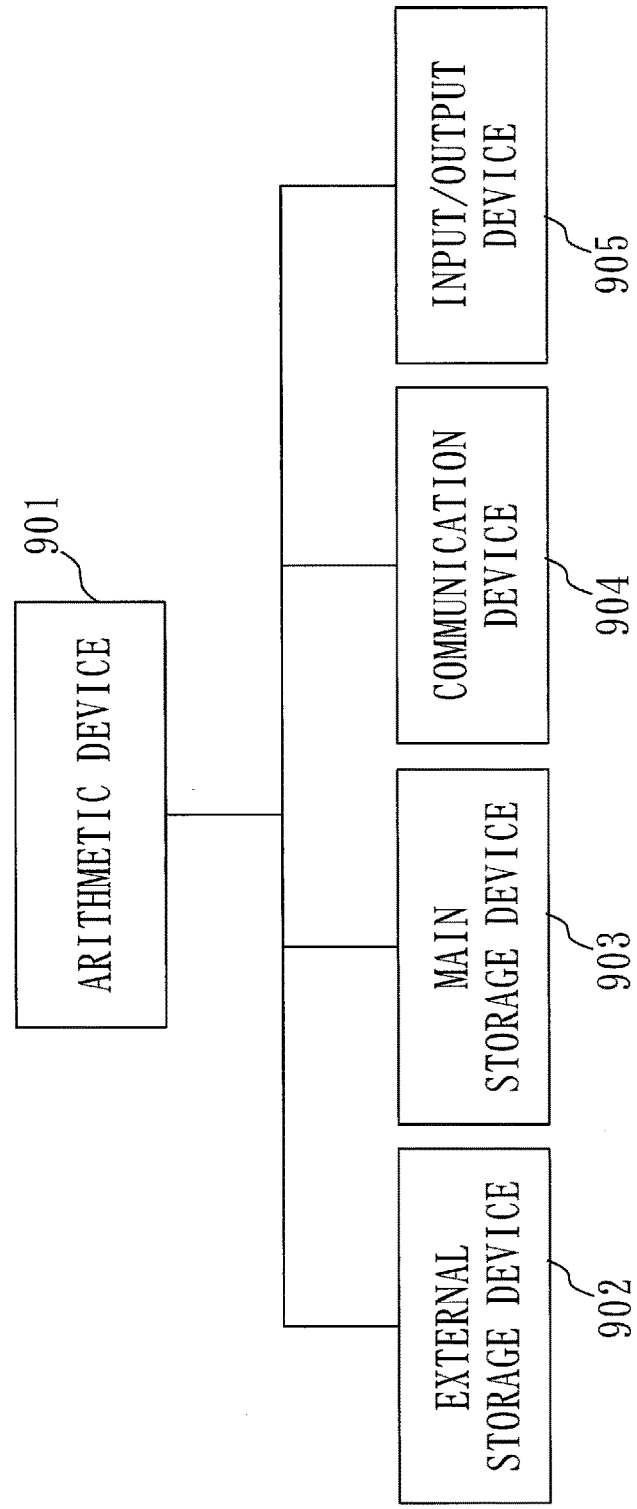
FIG. 17 is a diagram illustrating an example of a hardware configuration of each device of the key generation device 100, the encryption device 200, the decryption condition addition device 300, and the decryption device 400 described in the first embodiment.

FIG. 17 is a diagram illustrating an example of a hardware configuration of each device of the key generation device 100, the encryption device 200, the decryption condition addition device 300, and the decryption device 400 described in the first embodiment.

Each device is a computer. Each element of each device can be implemented by a program so as to constitute a data display program.

As the hardware configuration of each device, an arithmetic device 901, an external storage device 902, a main storage device 903, a communication device 904, and an input/output device 905 are connected to a bus.

The arithmetic device 901 is a CPU (Central Processing Unit) and the like to execute programs. The external storage device 902 is, for example, a ROM (Read Only Memory), a flash memory, a hard disk device, and the like. The main storage device 903 is, for example, a RAM (Random Access Memory) and the like. The communication device 904 is, for example, a communication board and the like. The input/output device 905 is, for example, a mouse, a keyboard, a display device, and the like.

The programs are normally stored in the external storage device 902, and are loaded into the main storage device 903 to be sequentially read and executed by the arithmetic device 901.

The programs are those that implement the functions each described as the " . . . part".

Further, the external storage device 902 stores an operating system (OS), and at least part of the OS is loaded into the main storage device 903. The arithmetic device 901 executes the above programs while executing the OS.

Information and the like described as being acquired, generated, output, and so on by the " . . . part" in the description of the first embodiment are stored in the main storage device 903 as files.

REFERENCE SIGNS LIST

10: cryptographic system; 100: key generation device; 110: information acquisition part; 120: master key generation part; 130: user secret key generation part; 140: key output part; 200: encryption device; 210: information acquisition part; 220: ciphertext generation part; 230: ciphertext output part; 300: decryption condition addition device; 310: information acquisition part; 311: public key acquisition part; 312: original ciphertext acquisition part; 313: condition acquisition part; 320: updated ciphertext generation part; 321: access structure updating part, 322: distributed value generation part; 323: additional cipher element generation part; 324: cipher element updating part; 330: ciphertext storage part; 340: ciphertext output part; 400: decryption device; 410: information acquisition part; 420: ciphertext determination part; 430: decryption part; 440: result output part; A: canonical basis; B, B*: basis; B^, B*^: subbasis; msk: master secret key; pk: public key; Γ: attribute set; M: secret distribution matrix; ρ: label; S, S': access structure; S⁺: additional access structure; m: message; $sk_\Gamma$: user secret key; $ct_s$: original ciphertext; $ct_{s'}$: updated ciphertext; t: identifier; $k^*_i$: key element; $c_i$: cipher element; s: distributed value

The invention claimed is:

1. A decryption condition addition device comprising:
   processing circuitry to:
   acquire an original ciphertext in which a secret distribution matrix is set as information specifying a decryption condition;
   restrict the decryption condition of the original ciphertext acquired; and
   generate an updated ciphertext for which the decryption condition of the original ciphertext is restricted by adding a row and a column which are related to the restriction condition acquired to the secret distribution matrix set in the original ciphertext,
   wherein in the original ciphertext, a cipher element indicating an attribute is set for each row of the secret distribution matrix as the information specifying the decryption condition, in addition to the secret distribution matrix, and
   wherein the processing circuitry
   acquires an attribute category and an attribute in the attribute category as the restriction condition, and generates the updated ciphertext by additionally setting a cipher element to the original ciphertext, the cipher element being related to the attribute category acquired, and the attribute in the attribute category being set in the cipher element.

2. A decryption condition addition device comprising:
processing circuitry to:
acquire an original ciphertext in which a secret distribution matrix is set as information specifying a decryption condition;
restrict the decryption condition of the original ciphertext acquired; and
generate an updated ciphertext for which the decryption condition of the original ciphertext is restricted by adding a row and a column which are related to the restriction condition acquired to the secret distribution matrix set in the original ciphertext,
wherein the processing circuitry arranges elements of the added row such that an element other than an element at the added column is 0, and arranges elements of the added column such that an element other than an element at the added row is 0.

3. The decryption condition addition device according to claim 2, in the processing circuitry adds one row and one column for one restriction condition.

4. The decryption condition addition device according to claim 3,
wherein when the processing circuitry adds rows L+1 to L+p and columns r+1 to r+p to the secret distribution matrix with L rows and r columns, where L, r, and p are positive integers, the processing circuitry arranges elements of the added rows and columns such that an element at row L+i and column r+i for each integer i=1, . . . , p is 1 and other elements are 0.

5. A cryptographic system comprising:
an encryption circuit to generate an original ciphertext in which a secret distribution matrix is set as information specifying a decryption condition;
a decryption condition addition circuit to acquire a restriction condition to restrict the decryption condition of the original ciphertext generated by the encryption circuit, and generate an updated ciphertext for which the decryption condition of the original ciphertext is restricted by adding a row and a column which are related to the restriction condition to the secret distribution matrix set in the original ciphertext; and
a decryption circuit to decrypt the updated ciphertext generated by the decryption condition addition device
wherein in the original ciphertext, a cipher element indicating an attribute is set for each row of the secret distribution matrix as the information specifying the decryption condition, in addition to the secret distribution matrix, and
wherein the decryption condition addition circuit
acquires an attribute category and an attribute in the attribute category as the restriction condition, and
generates the updated ciphertext by additionally setting a cipher element to the original ciphertext, the cipher element being related to the attribute category acquired, and the attribute in the attribute category being set in the cipher element.

6. A non-transitory computer readable medium storing a decryption condition addition program for causing a computer to execute:
an original ciphertext acquisition process to acquire an original ciphertext in which a secret distribution matrix is set as information specifying a decryption condition;
a condition acquisition process to acquire a restriction condition to restrict the decryption condition of the original ciphertext acquired by the original ciphertext acquisition process; and
an updated ciphertext generation process to generate an updated ciphertext for which the decryption condition of the original ciphertext is restricted by adding a row and a column which are related to the restriction condition acquired by the condition acquisition process to the secret distribution matrix set in the original ciphertext,
wherein in the original ciphertext, a cipher element indicating an attribute is set for each row of the secret distribution matrix as the information specifying the decryption condition, in addition to the secret distribution matrix, and
wherein the condition acquisition process acquires an attribute category and an attribute in the attribute category as the restriction condition, and
wherein the updated ciphertext generation process generates the updated ciphertext by additionally setting a cipher element to the original ciphertext, the cipher element being related to the attribute category acquired, and the attribute in the attribute category being set in the cipher element.

* * * * *